US011700094B2

(12) United States Patent
Xiao et al.

(10) Patent No.: US 11,700,094 B2
(45) Date of Patent: Jul. 11, 2023

(54) SIGNAL TRANSMISSION METHOD AND APPARATUS (71) Applicant: ZTE CORPORATION, Shenzhen (CN)

(72) Inventors: Huahua Xiao, Shenzhen (CN); Zhaohua Lu, Shenzhen (CN); Hao Wu, Shenzhen (CN); Yu Ngok Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 139 days.

(21) Appl. No.: 17/048,532

(22) PCT Filed: Apr. 4, 2019

(86) PCT No.: PCT/CN2019/081485
§ 371 (c)(1),
(2) Date: Oct. 16, 2020

(87) PCT Pub. No.: WO2019/201101
PCT Pub. Date: Oct. 24, 2019

(65) Prior Publication Data
US 2021/0167911 A1 Jun. 3, 2021

(30) Foreign Application Priority Data

Apr. 16, 2018 (CN) .......................... 201810340285.1

(51) Int. Cl.
*H04L 5/00* (2006.01)
*H04B 7/06* (2006.01)
(Continued)

(52) U.S. Cl.
CPC .......... *H04L 5/0048* (2013.01); *H04B 7/0626* (2013.01); *H04L 5/0057* (2013.01); *H04W 72/0446* (2013.01); *H04W 72/23* (2023.01)

(58) Field of Classification Search
CPC ..... H04L 5/0057; H04L 5/001; H04L 5/0048; H04L 5/0094; H04L 5/0062;
(Continued)

(56) References Cited

U.S. PATENT DOCUMENTS 10,512,046 B2 * 12/2019 Onggosanusi ........ H04L 5/0094
10,716,020 B2 * 7/2020 Onggosanusi ........ H04L 5/0048
(Continued)

FOREIGN PATENT DOCUMENTS

CN 104038312 A 9/2014
CN 104641582 A 5/2015
(Continued)

OTHER PUBLICATIONS

Chinese Office Action for Application No. 201810340285.1, dated Aug. 2, 2021, 29 pages including translation.
(Continued)

*Primary Examiner* — Yee F Lam
(74) *Attorney, Agent, or Firm* — Morgan, Lewis & Bockius LLP (57) ABSTRACT Provided are a signal transmission method and apparatus. The method includes the following steps: first signaling is configured, a slot for sending a reference signal is determined according to the first signaling, and the reference signal is sent on the slot for sending the reference signal.

18 Claims, 3 Drawing Sheets

Issue #2

(51) Int. Cl.
*H04W 72/04* (2023.01)
*H04W 72/0446* (2023.01)
*H04W 72/23* (2023.01)

(58) Field of Classification Search
CPC ............... H04L 5/0023; H04B 7/0626; H04W 72/0446; H04W 72/042
See application file for complete search history.

(56) References Cited

U.S. PATENT DOCUMENTS

| | | | | |
|---|---|---|---|---|
| 10,735,072 B2* | 8/2020 | Kwak | ................... | H04B 7/0695 |
| 2013/0114535 A1* | 5/2013 | Ng | ................... | H04L 5/0051 |
| | | | | 370/329 |
| 2013/0196675 A1* | 8/2013 | Xiao | ................... | H04B 7/0626 |
| | | | | 455/452.1 |
| 2016/0028448 A1* | 1/2016 | Park | ................... | H04B 7/26 |
| | | | | 375/267 |
| 2017/0245165 A1* | 8/2017 | Onggosanusi | ........ | H04L 5/0057 |
| 2017/0359791 A1* | 12/2017 | Onggosanusi | ........ | H04L 5/0053 |
| 2018/0049047 A1* | 2/2018 | Lin | ................... | H04L 5/0007 |
| 2018/0063835 A1* | 3/2018 | Abedini | ............. | H04W 72/042 |
| 2018/0287682 A1* | 10/2018 | Kwak | ................... | H04W 24/10 |
| 2019/0058517 A1* | 2/2019 | Kang | ................... | H04L 5/0023 |
| 2019/0090299 A1* | 3/2019 | Ang | ................... | H04L 5/001 |
| 2019/0109626 A1* | 4/2019 | Park | ................... | H04B 7/0486 |
| 2019/0132824 A1* | 5/2019 | Jeon | ................... | H04L 5/0092 |
| 2019/0132862 A1* | 5/2019 | Jeon | ................... | H04W 72/1289 |
| 2019/0208548 A1* | 7/2019 | Shih | ................... | H04W 74/004 |
| 2020/0177254 A1* | 6/2020 | Lee | ................... | H04B 7/063 |
| 2020/0221429 A1* | 7/2020 | Li | ................... | H04W 72/042 |

FOREIGN PATENT DOCUMENTS

| | | |
|---|---|---|
| CN | 104685807 A | 6/2015 |
| CN | 104704754 A | 6/2015 |
| CN | 105229932 A | 1/2016 |
| CN | 105308878 A | 2/2016 |
| CN | 106685500 A | 5/2017 |
| CN | 107733563 A | 2/2018 |
| JP | 2016178675 A | 10/2016 |
| WO | WO-2018028536 A1 | 2/2018 |
| WO | WO-2018231812 A1 * | 12/2018 ........... H04B 7/0626 |

OTHER PUBLICATIONS

International Search Report for Application No. PCT/CN2019/081485, dated Jun. 4, 2019, 4 pages.

VIVO, "Remaining Issues on CSI Measurement", 3GPP TSG RAN WG1 Meeting #92bis, R1-1803815, Apr. 6, 2018 (Apr. 6, 2018), section 1.

VIVO, "Remaining Issues on Simultaneous Reception of DL/UL Physical Channels and Reference Signals", 3GPP TSG RAN WG1 Meeting #92bis, R1-1803820, Apr. 6, 2018 (Apr. 6, 2018), section 2.

* cited by examiner

SIGNAL TRANSMISSION METHOD AND APPARATUS

CROSS-REFERENCE TO RELATED APPLICATIONS

This is a National Stage Application, filed under 35 U.S.C. 371 based on International Patent Application No. PCT/CN2019/081485, filed Apr. 4, 2019, which claims priority to Chinese Patent Application No. 201810340285.1 filed Apr. 16, 2018, the disclosures of which are incorporated herein by reference in their entireties.

TECHNICAL FIELD

The present application relates to the field of communications and, for example, to a signal transmission method and apparatus.

BACKGROUND

With the rapid growth of requirements for wireless communications in life and production, a wireless communication system has developed and evolved from the fourth-generation long term evolution (LTE) and LTE-Advanced (LTE-A) to the current fifth-generation new radio access technology (New RAT (NR)). However, in NR, LTE and other communication systems, for better information transmission in the future, a base station or a user needs to acquire relatively accurate channel state information (CSI). The CSI includes, but is not limited to, channel quality indication (CQI), a precoding matrix indicator (PMI), a rank indicator (RI) and a channel state information-reference signal (CSI-RS) resource indicator (CRI). To calculate the CSI, the base station or the user needs to send a reference signal (RS). A reference channel includes, but is not limited to, a CSI-RS, a channel state information-interference measurement (CSI-IM) signal and a sounding reference signal (SRS), where the CSI-RS includes a zero power CSI-RS (ZP CSI-RS) and a non-zero power CSI-RS (NZP CSI-RS). The NZP CSI-RS may be used for measuring a channel or interference. The CSI-RS may also be used for tracking and is thus referred to as a CSI-RS for tracking (TRS). The CSI-IM is generally used for measuring interference. The SRS is used for performing channel estimation. The CSI-RS, the SRS, the CSI-IM and other reference signals each includes a time domain characteristic in transmission. The time domain characteristic includes, but is not limited to, an aperiodic characteristic, a periodic characteristic or a semi-persistent characteristic, indicating that the transmitted reference signal is aperiodic, periodic or semi-persistent, respectively. A periodicity and/or slot offset information is configured for the periodic reference signal or the semi-persistent reference signal through high layer signaling. These two parameters may be jointly encoded (for example, periodicityAndOffset is configured through high layer signaling, and then the user may know a transmission periodicity and a transmission slot of the periodic reference signal, or a transmission periodicity and a transmission slot of the semi-persistent reference signal by acquiring this parameter). In a communication system, to save signaling overheads, multiple reference signal resources may be divided into multiple sets (such as a CSI-RS resource set, a CSI-IM resource set and an SRS resource set). The reference signal resource set includes at least one reference signal resource, and the multiple reference signal resource sets may be from the same reference signal resource setting (such as CSI-RS resource setting, SRS resource setting or CSI-IM resource setting, where the CSI-IM resource setting may be merged with the CSI-IM resource setting and both of them are referred to as the CSI-RS resource setting) to configure parameter information.

In the communication system, for data transmission, or in some high layer signaling, physical layer signaling and other signaling, channels are divided into a physical downlink control channel (PDCCH), a physical downlink shared channel (PDSCH), a physical uplink control channel (PUCCH) and a physical uplink shared channel (PUSCH). To demodulate these channels, it is necessary to use a demodulation reference signal (DMRS) to estimate a channel coefficient to demodulate data.

In an NR system, especially in a system at a high frequency band (for example, greater than or equal to 6 GHz), to overcome path loss, a base station and/or a terminal uses a radio frequency beam to obtain a beam gain. However, different base stations or different terminals, or different antenna panels of the base station, or antenna panels of the terminal may use different radio frequency beams when transmitting different physical shared channels or reference signals. Thus, the terminal or the base station needs to keep the same understanding of a spatial parameter when transmitting or receiving information (including the reference signal and/or the physical shared channel, where the reference signal includes, but is not limited to, the CSI-RS, the CSI-IM, the SRS and the TRS, and the physical shared channel includes, but is not limited to, the PUSCH and the PDSCH). The spatial parameter here includes, but is not limited to, one of the following: the radio frequency beam, a spatial receiver (Rx) parameter, transmission configuration indication (TCI), a beam index, a beam group index, or partial parameter information indication in quasi co-location. Different reference signals or different physical shared channels may be sent or received by using different radio frequency beams.

In the transmission of the reference signal and/or the physical shared channel, there are some defects in the related art. For example, there is a certain problem in the notification of the time domain characteristic of an aperiodic CSI-IM or an aperiodic TRS, so that the terminal cannot receive the reference signal well. Additionally, in the transmission of the reference signal, if there is an overlapping resource between the reference signal and the physical shared channel, it has not been well solved that how to effectively receive the reference signal and the physical shared channel which are transmitted on the common time domain resource.

SUMMARY

The present application provides a signal transmission method and apparatus, which can effectively implement the transmission of an aperiodic reference signal.

The present application provides a signal transmission method. The method includes the steps described below.

First signaling is configured.

A slot for sending a reference signal is determined according to the first signaling, and the reference signal is sent on the slot for sending the reference signal.

The present application further provides a signal transmission method. The method includes the steps described below.

Second signaling is configured.

At least one of a reference signal or a physical shared channel is sent on an overlapping time domain resource according to the second signaling.

The overlapping time domain resource is an overlapping portion of at least one time domain resource for sending the reference signal and at least one time domain resource for sending the physical shared channel.

The present application further provides a signal transmission method. The method includes the steps described below.

First signaling is received.

A slot corresponding to a reference signal is determined according to the received first signaling.

The reference signal is received on the determined slot corresponding to the reference signal.

The present application further provides a signal transmission method. The method includes the steps described below.

Second signaling is received.

At least one of a reference signal or a physical shared channel is received on an overlapping time domain resource according to the received second signaling.

The overlapping time domain resource is an overlapping portion of at least one time domain resource for transmitting the reference signal and at least one time domain resource for transmitting the physical shared channel.

The present application further provides a signal transmission apparatus configured on a first communication node. The apparatus includes a first configuration unit and a first sending unit.

The first configuration unit is configured to configure first signaling.

The first sending unit is configured to determine, according to the first signaling, a slot for sending a reference signal, and send the reference signal on the slot for sending the reference signal.

The present application further provides a signal transmission apparatus configured on a first communication node. The apparatus includes a second configuration unit and a second sending unit.

The second configuration unit is configured to configure second signaling.

The second sending unit is configured to send at least one of a reference signal or a physical shared channel on an overlapping time domain resource according to the second signaling.

The overlapping time domain resource is an overlapping portion of at least one time domain resource for sending the reference signal and at least one time domain resource for sending the physical shared channel.

The present application further provides a signal transmission apparatus configured on a second communication node. The apparatus includes a first reception unit and a first slot determination unit.

The first reception unit is configured to receive first signaling.

The first slot determination unit is configured to determine a slot corresponding to a reference signal according to the received first signaling.

The first reception unit is further configured to receive the reference signal on the determined slot corresponding to the reference signal.

The present application further provides a signal transmission apparatus configured on a second communication node. The apparatus includes a second reception unit.

The second reception unit is configured to receive second signaling.

The second reception unit is further configured to receive, according to the received second signaling, a reference signal and a physical shared channel on an overlapping time domain resource. The overlapping time domain resource is an overlapping portion of at least one time domain resource for transmitting the reference signal and at least one time domain resource for transmitting the physical shared channel.

The present application further provides a terminal. The terminal includes a memory, a processor, and a computer program stored in the memory and executable on the processor. The processor, when executing the computer program, implements processing of any signal transmission method provided by the present application.

The present application further provides a computer-readable storage medium storing a computer program. The computer program, when executed by a processor, implements processing of any signal transmission method provided by the present application.

Compared with the related art, the technical scheme of the present application includes the following steps: first signaling is configured, a slot for sending a reference signal is determined according to the first signaling, and the reference signal is sent on the slot for sending the reference signal. According to the scheme of the present application, a wireless communication system can achieve the purpose of normally sending or receiving an aperiodic signal by using the relevant periodic signaling without adding new aperiodic high layer signaling, that is, without modifying the standards.

BRIEF DESCRIPTION OF DRAWINGS

The drawings in the embodiments of the present application are described below. The drawings in the embodiments are used for a further understanding of the present application and for explaining the present application in conjunction with the specification. The drawings do not limit the scope of the present application.

DETAILED DESCRIPTION

For ease of understanding by those skilled in the art, a further description of the present application is provided below in conjunction with the drawings, which is not intended to limit the scope of the present application. An embodiment of the present application provides a mobile communication network (which includes, but is not limited to, a 5G mobile communication network). The network architecture of this network may include a network side device (for example, a base station) and a terminal. This embodiment provides an information transmission method executable on the preceding network architecture. It is to be noted that an execution environment of the preceding information transmission method provided by this embodiment of the present application is not limited to the preceding network architecture.

It is to be added that in the present application, in a downlink, a first communication node may be a base station side device, and a second communication node may be a terminal side device; certainly, in an uplink, the first communication node may be a terminal side device, and the second communication node may be a base station side device. In the case where two communication nodes are in a device-to-device communication, the first communication node and the second communication node may each be a base station or a terminal. The terminal may also be referred to as a user.

Figure 1A:
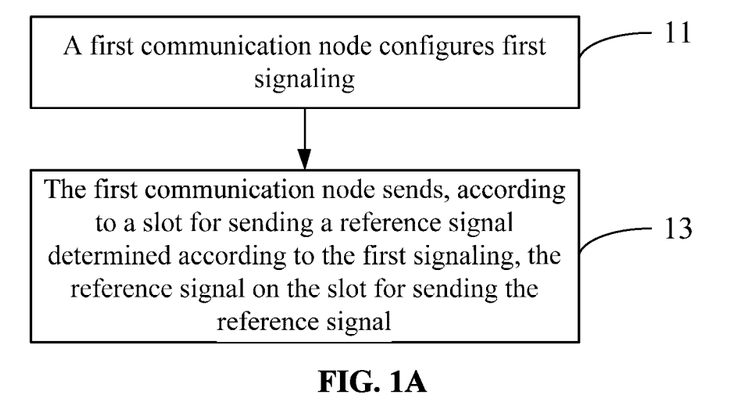
FIG. 1A is a flowchart of a signal transmission method according to an embodiment of the present application.

As shown in FIG. 1A, an embodiment of the present application provides a signal transmission method. The method includes steps 11 and 13.

In step 11, a first communication node configures first signaling.

In step 13, the first communication node sends, according to a slot for sending a reference signal determined according to the first signaling, the reference signal on the slot for sending the reference signal.

In an example, the first signaling includes trigger signaling and offset signaling. In another example, the first signaling is switch signaling.

Figure 1B:
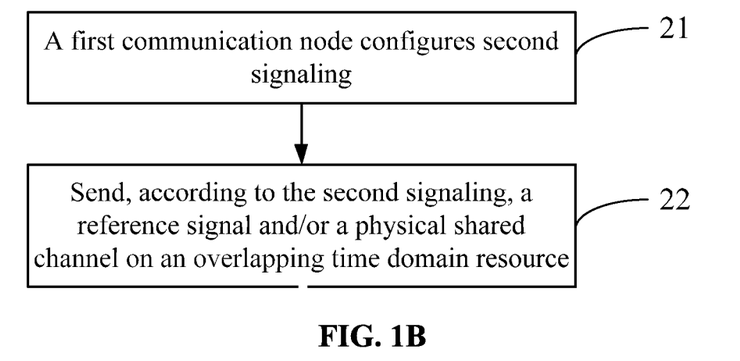
FIG. 1B is a flowchart of a signal transmission method according to an embodiment of the present application.

In an embodiment, before the step 13, the method further includes the following step: the first communication node determines, according to the first signaling, the slot for sending the reference signal. As shown in FIG. 1B, an embodiment of the present application provides a signal transmission method. The method includes steps 21 and 22.

In step 21, a first communication node configures second signaling.

In step 22, a reference signal and/or a physical shared channel is sent on an overlapping time domain resource according to the second signaling.

Figure 1C:
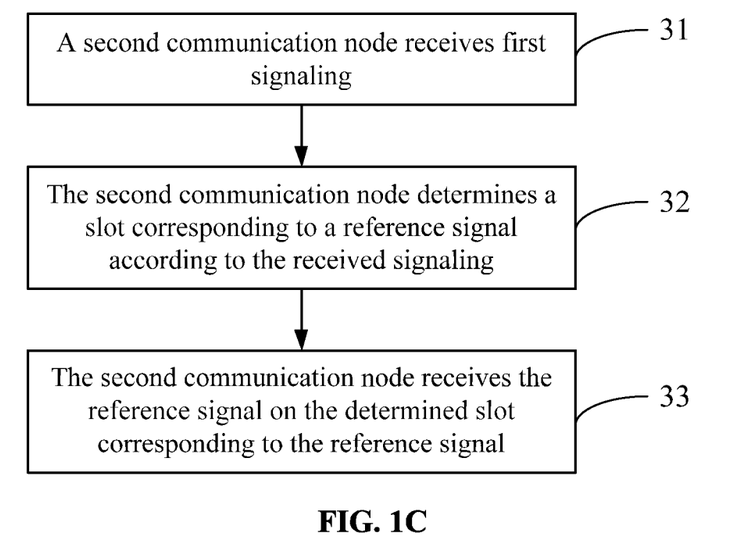
FIG. 1C is a flowchart of a signal transmission method according to an embodiment of the present application.

As shown in FIG. 1C, an embodiment of the present application provides a signal transmission method. The method includes steps 31, 32 and 33.

In step 31, a second communication node receives first signaling.

In step 32, the second communication node determines a slot corresponding to a reference signal according to the received first signaling.

In step 33, the second communication mode receives the reference signal on the determined slot corresponding to the reference signal.

Figure 1D:
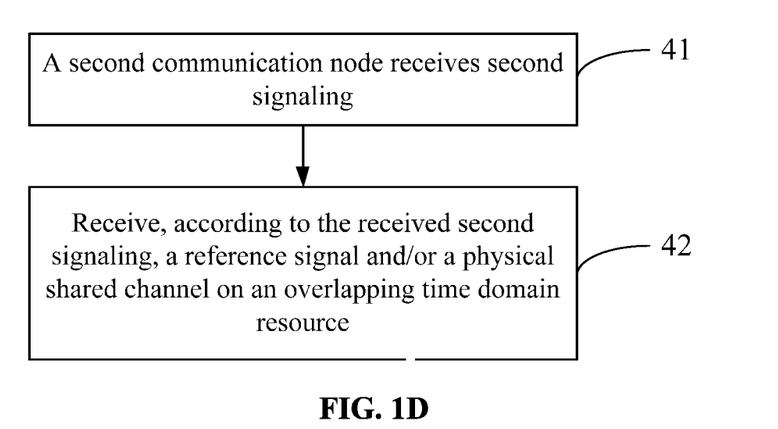
FIG. 1D is a flowchart of a signal transmission method according to an embodiment of the present application.

As shown in FIG. 1D, an embodiment of the present application provides a signal transmission method. The method includes steps 41 and 42.

In step 41, a second communication node receives second signaling.

In step 42, a reference signal and/or a physical shared channel are received on an overlapping time domain resource according to the received second signaling.

An embodiment of the present application provides a signal transmission method. The method includes a base station side method and a terminal side method described below.

The base station side method includes steps 110 to 140.

In step 110, a base station configures first signaling. The first signaling includes trigger signaling and offset signaling.

The offset signaling carries a slot offset, or joint information periodicityAndOffset about a periodicity and a slot offset.

The trigger signaling is signaling that triggers the transmission of the reference signal. The slot for sending the reference signal may be determined according to a starting point of a slot K for transmitting the trigger signaling and a slot offset n indicated by the offset signaling.

In step 120, the base station sends the trigger signaling and the offset signaling.

In step 130, the slot for sending the reference signal is determined according to the first signaling and the trigger signaling.

In step 140, the base station sends the reference signal.

The terminal side method includes steps 150, 160 and 170.

In step 150, a terminal receives trigger signaling and offset signaling.

In step 160, the terminal determines a slot corresponding to a reference signal according to the trigger signaling and the offset signaling.

The offset signaling carries a slot offset, or joint information periodicityAndOffset about a periodicity and a slot offset.

The trigger signaling is signaling that triggers the transmission of the reference signal. A slot for sending the reference signal may be determined according to a starting point of a slot K for transmitting the trigger signaling and a slot offset n indicated by the offset signaling.

The step 160 includes the following step: it is determined that the slot corresponding to the reference signal is K+n.

In step 170, the terminal receives, according to the determined slot corresponding to the reception of the reference signal, the reference signal sent by the base station.

The step 170 includes the following step: the terminal receives the reference signal on the slot K+n.

A description is given below in conjunction with exemplary implementation scenarios.

Embodiment One

This embodiment is used for illustrating a slot determination in the sending process of an aperiodic reference signal, for example, a CSI-IM (an aperiodic CSI-IM (AP CSI-IM)). A base station and a terminal send and receive the AP CSI-IM through the process described below. Here, one or more CSI-RS resource settings may be configured through high layer signaling. Each CSI-RS resource setting includes one or more CSI-IM resource sets. Each CSI-IM resource set includes one or more CSI-IM resources. A time domain characteristic of the CSI-IM here may be configured to be periodic, aperiodic or semi-persistent through the high layer signaling.

The base station configures first signaling, determines a slot for sending an aperiodic reference signal according to the first signaling, and sends AP CSI-IM resource(s) on the slot.

In an embodiment, the base station sends the first signaling.

The first signaling is high layer signaling. The first signaling includes, but is not limited to, at least one piece of the following information: a periodicity, a slot offset, or joint information periodicityAndOffset about a periodicity and a slot offset.

Here, the base station may send AP CSI-IM resource set(s), an aperiodic TRS resource, an aperiodic TRS resource set on the slot for sending the reference signal.

In an embodiment, the first signaling here is mainly used for indicating a periodicity and/or a slot offset of a periodic CSI-IM resource, or a periodicity and/or a slot offset of a periodic CSI-IM set.

In an embodiment, the base station configures trigger signaling and sends the trigger signaling. The trigger signaling is physical layer signaling or high layer signaling.

The base station determines, according to the first signaling and the trigger signaling, that the slot for sending the reference signal is K+n, where K denotes a slot for transmitting the trigger signaling, n denotes a slot offset determined according to the first signaling, and K and n are integers greater than or equal to 0.

The terminal receives the first signaling, determines a slot for receiving an aperiodic reference signal according to the first signaling, and receives AP CSI-IM resource(s) on the slot.

In an embodiment, the base station receives the trigger signaling. The trigger signaling is physical layer signaling or higher layer signaling.

Certainly, here, AP CSI-IM resource set(s), an aperiodic TRS resource, an aperiodic TRS resource set may be received on the slot.

The first signaling is high layer signaling, and includes at least one piece of the following information: a periodicity, a slot offset, or joint information periodicityAndOffset about a periodicity and a slot offset.

In an embodiment, the first signaling here is mainly used for indicating a periodicity and/or a slot offset of a periodic CSI-IM resource, or a periodicity and/or a slot offset of a periodic CSI-IM set.

In an embodiment, in the case where the first signaling is the slot offset, the terminal determines n for receiving the AP CSI-IM resource(s) or the AP CSI-IM resource set(s) through the slot offset, where n is a non-negative integer.

In an embodiment, in the case where the first signaling is the joint information periodicityAndOffset about the periodicity and the slot, the terminal acquires information about a slot offset portion by decoding the periodicityAndOffset, and uses the acquired information about the slot offset portion to determine the slot offset n for receiving the AP CSI-IM resource(s) or the AP CSI-IM resource set(s), where n is a non-negative integer.

The terminal determines the slot offset n according to the first signaling, and determines, according to the trigger signaling, that the slot for sending the reference signal is K+n, where K denotes the slot for transmitting the trigger signaling, n denotes the slot offset determined according to the first signaling, and K and n are integers greater than or equal to 0.

According to the method of this embodiment, a wireless communication system can achieve the purpose of normally sending or receiving the AP CSI-IM resource or the AP CSI-IM resource set by using the relevant signaling (periodicity and slot offset signaling, for example, periodicity And Offset) of the relevant periodic CSI-IM without adding new high layer signaling of the aperiodic CSI-IM, that is, without modifying the standards.

Certainly, the periodicity and slot offset signaling of the periodic CSI-IM may be for each CSI-IM resource, the transmission of the aperiodic CSI-IM resource may be for the CSI-IM resource set, and each CSI-IM resource set includes at least one CSI-IM resource. Therefore, there may be a situation where different CSI-IM resources in the same CSI-IM resource set may have different slot offsets. That is, slot offsets or slots of the channel state information-interference measurement resources in the aperiodic channel state information-interference measurement resource set may have different values. Certainly, in a special case, the slot offsets or the slots of the channel state information-interference measurement resources in the aperiodic channel state information-interference measurement resource set all have the same value. That is, the slot offsets or the slots of the channel state information-interference measurement resources in the aperiodic channel state information-interference measurement resource set are the same.

This embodiment is also applicable to other aperiodic reference signals, such as an aperiodic ZP CSI-RS or an aperiodic TRS, as long as the CSI-IM in this embodiment is replaced with the ZP CSI-RS or the TRS.

An application example is described below.

A base station configures periodicity and slot offset signaling of a periodic channel state information-interference measurement resource. Trigger signaling is configured and sent. A slot offset n is determined according to the periodicity and slot offset signaling of the periodic channel state information-interference measurement resource. It is determined, according to the slot offset n and a slot K for transmitting the trigger signaling, that a slot for sending an aperiodic channel state information-interference measurement resource or an aperiodic channel state information-interference measurement resource set is K+n, where n and K are non-negative integers.

A terminal receives the periodicity and slot offset signaling of the periodic channel state information-interference measurement resource, determines a slot offset n for receiving an aperiodic channel state information-interference measurement resource or an aperiodic channel state information-interference measurement resource set according to the periodicity and slot offset signaling of the periodic channel state information-interference measurement resource, receives the trigger signaling, and determines, according the slot K for receiving the trigger signaling, that a slot for sending a reference signal is K+n, where n and K are non-negative integers. The aperiodic channel state information-interference measurement resource or the aperiodic channel state information-interference measurement resource set is received on the slot K+n.

Embodiment Two

This embodiment is mainly used for illustrating the transmission process of an aperiodic reference signal in the case where information is transmitted through a carrier aggregation. A base station configures multiple serving cells (or carriers, or bandwidth parts (BWPs)) CCi. A subcarrier spacing corresponding to an i-th carrier (or a carrier, or a BWP) CCi is SCSi, where i=1, . . . , N, and N is an integer greater than 1. It is to be noted that a serving cell here may be replaced with a carrier or a BWP. Reference signals, for example, CSI-RSs, of multiple carriers are triggered across carriers by using one piece of physical downlink control information (DCI) (generally carried by a PDCCH), where it is assumed that the base station does not configure a quasi co-location type D (QCL type D). In the process described below, CSI-RS resources, CSI-RS resource sets or CSI-RS resource settings of multiple component carriers (CCs) are triggered through one piece of DCI.

First signaling is configured. First reference time Ki for sending AP CSI-RSs on N serving cells are determined according to the first signaling, where i=1, . . . , N.

In an embodiment, the base station sends the first signaling.

Here, for example, the first signaling may be physical DCI.

Here, in an embodiment, an AP CSI-RS may be one of the following reference signals: an AP CSI-RS resource set, an AP CSI-RS resource setting, a semi-persistent (SP) CSI-RS, an SP CSI-RS resource set, an SP CSI-RS resource setting, an AP TRS resource, an AP TRS resource set, an AP TRS resource setting, an AP SRS resource, an AP SRS resource set, or an AP SRS resource setting.

Here, in an embodiment, the first reference time Ki for sending the AP CSI-RS on an i-th serving cell is the minimum slot not earlier than time T, or not earlier than a slot where time T is located, or the minimum symbol not earlier than time T. Time T denotes the last symbol of a time domain resource for transmitting cross-serving cell triggering signaling, where i=1, ..., N.

Offset signaling is configured. The offset signaling is high layer signaling or physical layer signaling. The offset signaling includes a slot offset n for sending a reference signal, where n is a non-negative integer.

Here, an application example is described below. Without loss of generality, using three serving cells as an example, serving cell 1 (CC1) has a carrier spacing of 15 K, serving cell 2 (CC2) has a carrier spacing of 60 K, and serving cell 3 (CC3) has a carrier spacing of 120 K. Then, a slot for sending a reference signal by each serving cell may be determined in at least one of the manners described below, where first signaling here is DCI. There may be three cases described below.

Case 1: The DCI is transmitted on a CC having the smallest carrier spacing, for example, on CC1. Generally, the DCI is transmitted on the first 1 to 3 symbols of a slot. It is assumed that the last symbol of a control-resource set (CORESET) for transmitting the DCI is a symbol, T=2. Then, a symbol of CC2 that T=2 corresponds to is the fourth symbol, and corresponds to the eighth symbol of CC3. The symbols all belong to the first slot. Thus, each serving cell determines to send an AP CSI-RS of the i-th serving cell on the minimum slot, K1=K2=K3=1, not later than T, that is on the slot Ki+n. Ki denotes the first reference time for sending the reference signal by the i-th serving cell, where i=1, 2, 3. Here, the slot corresponding to n is the slot corresponding to each serving cell. For example, n=4, then the slot for sending the reference signal by the i-th serving cell is 5, where i=1, 2, 3.

Case 2: The DCI is transmitted on a CC having the greatest carrier spacing, for example, on CC3. Generally, it is assumed that the DCI is transmitted on the second symbol, T=2, of the eighth slot of CC3, a symbol of CC1 corresponding to T=2 of the eighth slot of CC3 is the (ceil(7*14+2)/16)-th symbol (that is, the seventh symbol in the first slot), which is equal to the (ceil(7*14+2)/4)-th symbol (that is, the 25-th symbol in the second slot) of CC2. Thus, the first reference time of CC1, CC2 and CC3 are K1=1, K2=2, and K3=8, respectively. Then, the first serving cell sends an AP CSI-RS on the (n+1)-th slot, the second serving cell sends an AP CSI-RS on the (n+2)-th slot, and the third serving cell sends an AP CSI-RS on the (n+8)-th slot.

Case 3: The DCI is transmitted on a CC having a middle carrier spacing, for example, on CC2. Generally, it is assumed that the DCI is transmitted on the second symbol, T=2, of the third slot of CC2. Then a symbol of CC1 that T=2 of the third slot of CC2 corresponds to is the (ceil (2*14+2)/4)-th symbol (that is, the eighth symbol in the first slot), which is equal to the (ceil(2*14+2)*4)-th symbol (that is, the 120-th symbol in the ninth slot) of CC2. Thus, the first reference time of CC1, CC2 and CC3 are K1=1, K2=3, and K3=9, respectively. Then, the first serving cell sends an AP CSI-RS on the (n+1)-th slot, the second serving cell sends an AP CSI-RS on the (n+3)-th slot, and the third serving cell sends an AP CSI-RS on the (n+9)-th slot.

The terminal receives the first signaling, and determines slots for receiving AP CSI-RSs on N serving cells according to the first signaling.

Here, for example, the first signaling may be the physical DCI.

Figure 2:
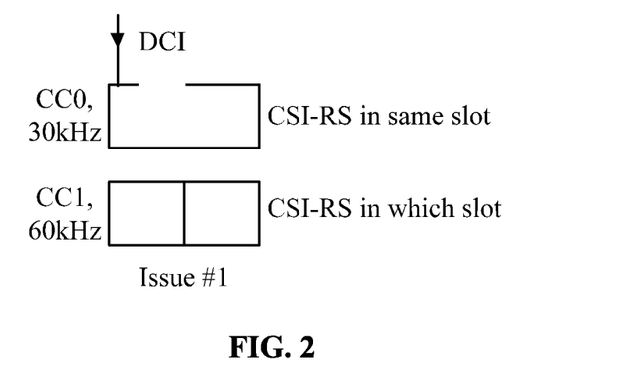
FIG. 2 is a signal schematic diagram of a signal transmission method according to an embodiment of the present application.

As shown in FIG. 2, FIG. 2 is a signaling schematic diagram of a signal transmission method according to this embodiment. For two carriers CC0 and CC1, a slot for sending a CSI-RS is indicated through DCI. For carrier CC0, a CSI-RS is sent on the same slot as the DCI, and for carrier CC1, a CSI-RS is sent on a slot later than the DCI. Which slot to send the CSI-RS needs to be determined according to the last symbol of a time domain resource where the DCI is transmitted on CC0.

Here, in an embodiment, the AP CSI-RS may also be one of the following reference signals: an AP CSI-RS resource set, an AP CSI-RS resource setting, an SP CSI-RS, an SP CSI-RS resource set, an SP CSI-RS resource setting, an AP TRS resource, an AP TRS resource set, an AP TRS resource setting, an AP SRS resource, an AP SRS resource set, or an AP SRS resource setting.

Here, in an embodiment, first reference time Ki for receiving an AP CSI-RS of the i-th CC is determined according to the first signaling, where i=1, ..., N, and N is an integer greater than 1.

Here, in an embodiment, first reference time for receiving AP CSI-RSs on N serving cells is the minimum slot not later than time T. Time T denotes the last symbol of a time domain resource for receiving or transmitting the first signaling.

Offset signaling is received. The offset signaling is high layer signaling or physical layer signaling. The offset signaling includes a slot offset n for receiving a reference signal, where n is a non-negative integer.

The aperiodic channel state information-reference signals on the N serving cells are separately received on the N determined slots, where N is an integer greater than 1. That is, the aperiodic channel state information-reference signal of the i-th CC is received in a slot Ki+n, where i=1, ..., N, and N is an integer greater than 1.

In this embodiment, the slot Ki+n for sending a reference signal on the i-th serving cell is a slot with a corresponding carrier spacing.

In this embodiment, a slot offset n on the i-th serving cell is defined based on numerology on the i-th serving cell. For example, in this embodiment, the slot length of a slot of the i-th serving cell is $1/(2^{Ni})$ milliseconds, Ni is 1, 4, 8 on CC1, CC2, CC3, respectively, and different carrier spacings that values of the numerology correspond to are $2^{Ni}*15K$, where i=1, 2, 3, and ^denotes an exponent operation.

It is to be noted that there is such a scenario: in the case of cross-serving cell triggering, each serving cell corresponds to the same numerology or the same subcarrier spacing. That is, in the case of cross-serving cell triggering reference signal, the N serving cells has the same numerology or the same subcarrier spacing.

Embodiment Three

In this embodiment, an AP TRS is sent or received. The AP TRS is divided into two parts: a first part of the AP TRS and a second part of the AP TRS. The first part of the AP TRS and the second part of the AP TRS may carry the same information which includes, but is not limited to, one of the following: the same number of ports, the same time domain position, the same subcarrier position or the same transmit power. Moreover, the first part of the AP TRS and the second part of the AP TRS are sent on two consecutive slots respectively.

A base station configures first signaling, and determines a slot for sending the aperiodic tracking reference signal according to the first signaling.

In an embodiment, the base station sends the first signaling.

The base station sends the aperiodic tracking reference signal on the slot determined according to the first signaling.

In an embodiment, the base station determines, according to the first signaling, a first slot K+n of the two slots for sending the TRS, where K denotes a slot where a resource for sending the first signaling is located, n denotes a slot or a slot offset relative to the slot for sending the first part of the aperiodic tracking reference signal. In an embodiment, the base station configures offset signaling. The offset signaling includes the slot offset n, where n is a non-negative integer.

In an embodiment, the slot for sending the first part of the aperiodic tracking reference signal is determined according to the first signaling. The slot for sending the first part of the aperiodic tracking reference signal is used for sending the first part of the aperiodic tracking reference signal.

For example, the slot for sending the first part of the aperiodic TRS determined by the base station is a slot K+n, where K denotes the slot where the resource for transmitting the first signaling is located, n denotes the slot or the slot offset relative to the slot for sending the first part of the aperiodic tracking reference signal. Generally, the TRS is transmitted by using two slots. That is, a first group of TRS resources are transmitted on the slot K+n, and a second group of TRS resources are transmitted on a slot K+n+1.

A terminal receives the first signaling, and determines a slot for receiving the aperiodic tracking reference signal according to the first signaling.

The terminal receives the aperiodic tracking reference signal on the slot.

In an embodiment, the terminal determines, according to the first signaling, a first slot K+n of two slots for receiving the TRS, where K denotes a slot where a resource for receiving the first signaling is located, and n denotes the slot offset relative to the slot for receiving the first part of the aperiodic tracking reference signal. In an embodiment, the terminal receives the offset signaling. The offset signaling includes the slot offset n, where n is a non-negative integer.

In an embodiment, the slot for receiving the first part of the aperiodic tracking reference signal is determined according to the first signaling.

For example, the slot for receiving the first part of the TRS determined by the terminal is slot K+n, where K denotes the slot where the resource for transmitting the first signaling is located, and n denotes a slot or a slot offset of the first slot for receiving the tracking reference signal. Generally, the TRS is received by using two slots. That is, the first group of TRS resources are received on a slot T+n, and the second group of TRS resources are received on slot T+n+1.

Figure 3:
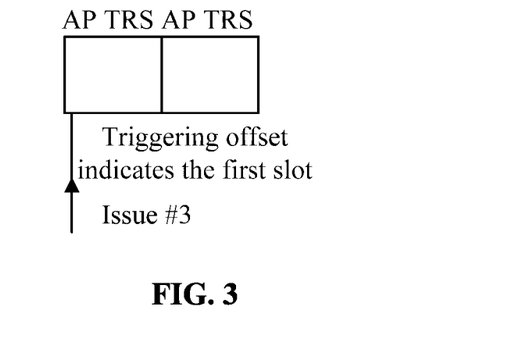
FIG. 3 is a signal schematic diagram of a signal transmission method according to an embodiment of the present application.

As shown in FIG. 3, FIG. 3 is a signaling schematic diagram of a signal transmission method according to this embodiment. An AP TRS is transmitted by using two slots. The first part of the AP TRS is transmitted on the first slot, and the second part of the AP TRS is transmitted on the second slot. A slot offset is determined relative to the first slot in FIG. 3.

Embodiment Four

This embodiment is mainly used for illustrating methods for sending and receiving a reference signal in the switch of multiple BWPs (which is a set of physical resource blocks for transmitting resources and, generally, includes multiple consecutive physical resource blocks, where each physical resource block includes multiple subcarriers and multiple time domain symbols, and the BWP may be referred to as a partial bandwidth). Without loss of generality here, it is assumed that a system configures N BWPs, where the i-th BWP is denoted as BWPi, where i=1, . . . , N, and N is an integer greater than 1. Without loss of generality, a BWP for transmitting first signaling is denoted as BWP0, and a BWP which needs to be switched to is denoted as BWP 1.

A base station configures the first signaling, and determines a slot for sending an aperiodic tracking reference signal according to the first signaling.

In an embodiment, the base station sends the first signaling on BWP0.

The base station determines the slot for sending the aperiodic tracking reference signal according to the first signaling.

In an embodiment, K1 slots before BWP1 takes effect or first K2 slots after BWP1 takes effect are determined as slots for sending the aperiodic tracking reference signal according to the first signaling, where K1 and K2 are positive integers.

The value of K1 may be determined in a manner of terminal reporting, or in a manner of base station configuring, or in a manner of agreement.

A possible scheme is that the base station notifies, through the first signaling, starting transmission time T of a PDSCH of BWP1, or time T that the BWP takes effect, and uses the K1 slots before T as a measurement interval, and transmits the TRS in the measurement interval. Another possible implementation scheme is that the base station determines, through the first signaling, time T that the BWP takes effect or starting transmission time T of a PDSCH, and transmits the TRS on the first K2 slots after T. Here, T, K1 and K2 are integers, and T is greater than or equal to BWP switch time. In an embodiment, the value of K2 may be 1 or 2.

In an embodiment, the first signaling includes one piece of the following information: the switch time from BWP0 to BWP1, the starting position of the physical downlink shared channel of BWP1, or the time that BWP1 takes effect.

A terminal receives the first signaling, and determines a slot for receiving the aperiodic tracking reference signal according to the first signaling.

In an embodiment, the terminal receives the first signaling on BWP0.

The terminal receives the aperiodic tracking reference signal on the slot determined according to the first signaling.

In an embodiment, K1 slots before BWP1 takes effect or first K2 slots after BWP1 takes effect are determined as reception slots according to the first signaling, where K1 and K2 are positive integers.

The value of K1 may be determined in a manner of terminal reporting, or in a manner of base station configuring, or in a manner of agreement.

A possible scheme is that starting time T of a PDSCH of BWP1, or time T that the BWP takes effect is notified through the first signaling, K1 slots before T are used as a measurement interval, and the TRS is received in the measurement interval. Another possible implementation scheme is that the base station determines, through the first signaling, the time T that the BWP takes effect or the starting time T of the PDSCH, and receives the TRS on the first K2 slots after T. Here, T, K1 and K2 are integers, and T is greater than or equal to BWP switch time. In an embodiment, the value of K2 may be 1 or 2.

In an embodiment, the first signaling includes one piece of the following information: the switch time from BWP0 to BWP1, the starting position of the physical downlink shared channel of BWP1, or the time that BWP1 takes effect.

In an embodiment, the base station or the terminal determines, in a manner of first signaling implying, that the aperiodic TRS is on first K1 slots when the BWP takes effect or first K1 slots after the BWP takes effect.

Figure 4:
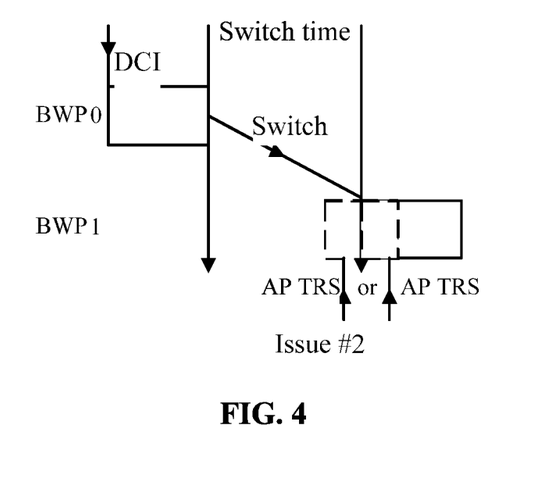
FIG. 4 is a signal schematic diagram of a signal transmission method according to an embodiment of the present application.

As shown in FIG. 4, FIG. 4 is a signaling schematic diagram of a signal transmission method according to this embodiment. The BWP switch is triggered through DCI signaling. To acquire a slot offset on BWP1 and other information, the AP TRS needs to be sent on K1 slots before BWP1 takes effect or K2 slots after BWP1 takes effect.

Embodiment Five

This embodiment is used for illustrating how to determine a valid slot for sending a reference signal in the case where a determined slot for sending the reference signal is not a valid slot. The reference signal here includes, but is not limited to, one of the following reference signal resources: a CSI-RS, a CSI-IM, a TRS, a reference signal resource set, or a reference signal resource set setting, where CSI-RSs may be used for a channel measurement and an interference measurement. Each reference signal may include one of the following time domain characteristics: a periodic reference signal resource, an aperiodic reference signal resource, or a semi-persistent reference signal resource, for example, a periodic CSI-RS, a semi-persistent SCI-RS or an aperiodic CSI-RS.

A base station configures first signaling, determines a slot T for sending the reference signal according to the first signaling, and sends the reference signal on the slot.

Here, a method of determining the slot T for sending the aperiodic reference signal includes, but is not limited to, the methods described in embodiments one to four.

If the slot T is a valid slot, the reference signal is sent on the slot T. If the slot is not a valid slot, it is necessary to find the minimum valid slot from slots greater than T to send the reference signal. The valid slot refers to a downlink slot for transmitting a downlink signal, or a slot in which the number of symbols for transmitting the downlink signal is greater than N, where N is an integer greater than N0, and N0 is a positive integer.

The manner in which the minimum valid slot after the T is found includes, but is not limited to, one of the manners described below.

T1 is determined as the valid slot for sending the reference signal, where T1 denotes the minimum valid slot greater than T.

Alternatively, a slot index of the T is increased by a step of 1 until a valid slot with the smallest index is found.

T+T0 is determined as the valid slot for sending the reference signal, where T0 is a positive integer, and T+T0 denotes the minimum valid slot.

The terminal receives the first signaling, determines a slot T for receiving the reference signal according to the first signaling, and receives the reference signal on the slot for receiving the reference signal.

Here, the manner in which the slot T for receiving the aperiodic reference signal is determined includes, but is not limited to, the manners described in embodiments one to four.

If the slot T is a valid slot, the reference signal is received on the slot T. If the slot is not a valid slot, it is necessary to find the minimum valid slot from slots greater than T to receive the reference. The valid slot refers to a downlink slot for transmitting a downlink signal, or a slot in which the number of symbols for transmitting the downlink signal is greater than N, where N is an integer greater than N0, and N0 is a positive integer.

The manner in which the minimum valid slot after the T is found includes, but is not limited to, one of the manners described below.

T1 is determined as the valid slot for sending the reference signal, where T1 denotes the minimum valid slot greater than T.

Alternatively, a slot index of the T is increased by a step of 1 until a valid slot with the smallest index is found.

T+T0 is determined as the valid slot for sending the reference signal, where T0 is a positive integer and T+T0 denotes the minimum valid slot.

Embodiment Six

This embodiment is used for illustrating the calculation for a time interval of a CSI process of CSI if there are multiple types of reference signals to be sent. A reference signal includes, but is not limited to, one of the following reference signal resources: a CSI-RS, a CSI-IM, a reference signal resource set, or a reference signal resource set setting, where CSI-RSs may include a CSI-RS used for a channel measurement and a CSI-RS used for an interference measurement. Each type of reference signal may include one of the following time domain characteristics: a periodic reference signal resource, an aperiodic reference signal resource, or a semi-persistent reference signal resource, for example, a periodic CSI-RS, a semi-persistent SCI-RS or an aperiodic CSI-RS.

A base station configures first signaling, and determines slot offsets for sending K1 types of reference signals. The slot offsets at least includes one of the following offsets of reference signals: a slot offset n1 of a channel state information-reference signal resource for a channel measurement, a slot offset n2 of a channel state information-reference signal resource for an interference measurement, or a slot offset n3 of a channel state information-interference measurement resource. Moreover, a slot for sending a corresponding reference signal is determined according to the slot offset and time K that the first signaling is triggered, so as to send the corresponding reference signal. K1 is an integer greater than 1.

For example, if the channel state information-reference signal resource for the channel measurement is to be sent, the channel state information-reference signal resource for the channel measurement is sent on a slot K+n1; if the channel state information-reference signal resource for the interference measurement is to be sent, the channel state information-reference signal resource for the interference measurement is sent on a slot K+n2; if the CSI-IM resource is to be sent, the CSI-IM resource is sent on a slot K+n3.

Thus, time intervals of CSI processes corresponding to the K1 types of reference signals are from K+T to N, where K denotes a slot for triggering the reference signal, K1 is a positive integer, and K is a non-negative integer. Here, T denotes the maximum value of at least one of the following slot offsets: the slot offset n1 of the channel state information-reference signal resource for the channel measurement, the slot offset n2 of the channel state information-reference signal resource for the interference measurement, or the slot offset n3 of the channel state information-interference measurement resource. N denotes a slot of CSI reporting corresponding to the CSI process, that is, a slot for reporting CSI.

A terminal receives the first signaling, and determines slot offsets for receiving the K1 types of reference signals. The slot offsets at least include one of the following slot offsets of reference signals: a slot offset n1 of a channel state information-reference signal resource for a channel measurement, a slot offset n2 of a channel state information-reference signal resource for an interference measurement, or a slot offset n3 of a channel state information-interference measurement resource. Moreover, a slot for receiving a corresponding reference signal is determined according to a slot offset and time K that the first signaling is triggered, so as to send the corresponding reference signal. K1 is an integer greater than 1.

For example, if the channel state information-reference signal resource for the channel measurement is to be received, the channel state information-reference signal resource for the channel measurement is received on a slot K+n1; if the channel state information-reference signal resource for the interference measurement is to be received, the channel state information-reference signal resource for the interference measurement is received on a slot K+n2; if the CSI-IM resource is to be received, the CSI-IM resource is received on a slot K+n3, where K denotes a slot for receiving the first signaling or a slot for triggering a reference signal.

Then, CSI time intervals calculated by using CSI processes corresponding to the received K1 types of reference signals are from K+T to N, where K denotes a slot for triggering the reference signal (for example, a slot for transmitting the first signaling), K1 is a positive integer, and K is a non-negative integer. Here, T denotes the maximum value of at least one of the following slot offsets: the slot offset n1 of the channel state information-reference signal resource for the channel measurement, the slot offset n2 of the channel state information-reference signal resource for the interference measurement, or the slot offset n3 of the channel state information-interference measurement resource. N denotes a slot of CSI reporting corresponding to the CSI process, that is, a slot for reporting CSI.

Embodiment Seven

This embodiment is used for illustrating how a base station determines a transmit beam and how a terminal determines a receive beam in the case where a transmit slot for sending a reference signal and a transmit slot for sending a physical shared channel overlap. The reference signal here includes, but is not limited to, one of the following reference signal resources: a CSI-RS, a CSI-IM, a TRS, an SRS, an SSB (which is a resource block for transmitting a primary synchronization signal (PSS) or a secondary synchronization signal (SSS)), a reference signal resource set, or a reference signal resource set setting. Each type of reference signal may include one of the following time domain characteristics: a periodic reference signal resource, an aperiodic reference signal resource, or a semi-persistent reference signal resource, for example, a periodic CSI-RS, a semi-persistent SCI-RS or an aperiodic CSI-RS. The physical shared channel includes a PDSCH or a PUSCH. A first communication node sends the reference signal and the physical shared channel in the manner described below.

The first communication node configures second signaling information, and sends, according to the second signaling, the reference signal and/or the physical shared channel on an overlapping time domain resource.

The overlapping time domain resource is an overlapping portion of at least one time domain resource for sending the reference signal and at least one time domain resource for sending the physical shared channel.

The step in which the reference signal and/or the physical shared channel is sent on the overlapping time domain resource according to the second signaling includes one of the cases described below.

Only the reference signal is sent; only the physical shared reference channel is sent; or the reference signal and the physical shared reference channel are sent.

In an embodiment, the second signaling is high layer signaling, and the reference signal and/or the physical shared channel is determined to be sent on the overlapping time domain resource by using the high layer signaling.

Alternatively, the second signaling is physical layer signaling, and the reference signal and/or the physical shared channel is determined to be sent on the overlapping time domain resource according to at least one of capability of a receiving end, a spatial parameter corresponding to the reference signal, or a spatial parameter corresponding to the physical shared channel, or according to a combination thereof.

The reference signal and the physical shared channel sent on the overlapping time domain resource may include, but are not limited to, one of the following combinations: the CSI-RS and the PDSCH, the CSI-IM and the PDSCH, the TRS and the PDSCH, the SSB and the PDSCH, the SRS and the PUSCH (where the time domain characteristic of each reference signal may be periodic, aperiodic or semi-persistent), or a reference signal resource set.

In an embodiment, the second signaling includes at least three possible values: V1, V2, V3 corresponding to sending only the reference signal, sending only the physical shared channel, sending the reference signal and the physical shared channel, respectively.

In an embodiment, the spatial parameter includes, but is not limited to, one of the following: a transmit beam index, a transmit beam group index, a receive beam index, a receive beam group index, a spatial receiver parameter, a quasi co-location type D, a TCI, or a transmission configuration indication state.

A second communication node receives the second signaling information, and receives, according to the second signaling, the reference signal and/or the physical shared channel on an overlapping time domain resource.

The overlapping time domain resource is an overlapping portion of at least one time domain resource for receiving the reference signal and at least one time domain resource for receiving the physical shared channel.

The step in which the reference signal and/or the physical shared channel is received on the overlapping time domain resource according to the second signaling includes one of the cases described below.

Only the reference signal is received; only the physical shared channel is received; or the reference signal and the physical shared channel are received.

In an embodiment, the second signaling is high layer signaling, and the reference signal and/or the physical shared channel is determined to be received on the overlapping time domain resource according to the high layer signaling.

Alternatively, the second signaling is physical layer signaling, and the reference signal and/or the physical shared channel is determined to be received on the overlapping time domain resource according to at least one of a capability of a receiving end, a spatial parameter corresponding to the reference signal, or a spatial parameter corresponding to the physical shared channel, or according to a combination thereof.

The reference signal and the physical shared channel received on the overlapping time domain resource may include, but are not limited to, one of the following combinations: the CSI-RS and the PDSCH, the CSI-IM and the PDSCH, the TRS and the PDSCH, the SSB and the PDSCH, the SRS and the PUSCH (where the time domain characteristic of each reference signal may be periodic, aperiodic or semi-persistent), or a reference signal resource set.

In an embodiment, the second signaling includes at least three possible values: V1, V2, V3 corresponding to receiving only the reference signal, receiving only the physical shared channel, receiving the reference signal and the physical shared channel, respectively.

In an embodiment, the spatial parameter includes, but is not limited to, one of the following: a transmit beam index, a transmit beam group index, a receive beam index, a receive beam group index, a spatial receiver parameter, a quasi co-location type D, a TCI, or a transmission configuration indication state.

In an embodiment, if the transmitted physical shared channel is the PUSCH, then the first communication node is the terminal, and the second communication node is the base station; if the transmitted physical shared channel is the PDSCH, then the first communication node is the base station, and the second communication node is the terminal.

Based on the same or similar concept as the preceding embodiments, an embodiment of the present application further provides a signal transmission apparatus configured on a first communication node. The signal transmission apparatus provided by the present application includes a first configuration unit and a first sending unit.

The first configuration unit is configured to configure first signaling.

The first sending unit is configured to send, according to a slot for sending a reference signal determined according to the first signaling, the reference signal on the slot for sending the reference signal.

In this embodiment of the present application, the first signaling includes offset signaling.

The offset signaling includes joint information periodicityAndOffset about a periodicity and a slot offset.

In this embodiment of the present application, the first signaling includes trigger signaling and the offset signaling.

It is determined, according to the trigger signaling and the offset signaling, that the slot for the reference signal is K+n, where K denotes a slot for transmitting the trigger signaling, n denotes a slot offset determined according to the offset signaling, and K and n are integers greater than or equal to 0.

The first sending unit is configured to send, according to the slot K+n for sending the reference signal determined according to the first signaling, the reference signal on the slot K+n for sending the reference signal.

In this embodiment of the present application, the reference signal includes at least one of the following reference signals: an AP CSI-IM resource, an AP CSI-IM resource set, an aperiodic TRS resource, or an aperiodic TRS resource set.

In this embodiment of the present application, the first signaling includes cross-serving cell trigger signaling.

First reference time Ki of N serving cells is determined according to the cross-serving cell trigger signaling, where Ki is an integer greater than or equal to 0, i=1, . . . , N, and N is an integer greater than 1.

In this embodiment of the present application, the first reference time Ki is the minimum slot not earlier than time T, or the first reference time Ki is not earlier a slot where time T is located, or the first reference time Ki is the minimum symbol not earlier than time T, where Time T denotes the last symbol of a time domain resource for transmitting cross-serving cell triggering signaling.

In this embodiment of the present application, the first signaling further includes the offset signaling.

It is determined, according to the offset signaling and the first reference time Ki, that a slot on which an i-th serving cell sends a reference signal is Ki+n, where n denotes a slot offset value configured through the offset signaling. A slot offset value of the i-th serving cell is determined by a numerology of the i-th serving cell. Ki and n are non-negative integers, i=1, . . . and N, and N is an integer greater than 1.

In this embodiment of the present application, the first sending unit is configured to send, according to the determined slot Ki+n for sending the reference signal, the reference signal on a respective slot Ki+n corresponding to each serving cell, where the respective slot Ki+n is for sending the reference signal.

The reference signal includes, but is not limited to, at least one of the following: an aperiodic channel state information-reference signal resource, an aperiodic channel state information-reference signal resource set; an AP CSI-IM resource; or an AP CSI-IM resource set.

In this embodiment of the present application, the N serving cells triggered by the cross-serving cell trigger signaling have the same carrier spacing or the same numerology, where N is an integer greater than 1.

In this embodiment of the present application, the first signaling includes the trigger signaling and the offset signaling.

The slot for sending the reference signal determined according to the trigger signaling and the offset signaling is K+n or K+n+1, where K denotes a slot for transmitting the trigger signaling, n denotes a slot offset carried by the offset signaling, and K and n are non-negative integers.

In this embodiment of the present application, the first sending unit is configured to send a first part of an aperiodic tracking reference signal on the slot K+n for sending the reference signal, and send a second part of the aperiodic tracking reference signal on the slot K+n+1 for sending the reference signal In this embodiment of the present application, the first signaling is switch signaling, and the following slots are determined, according to the first signaling, as slots for sending the reference signal: K1 slots before a second bandwidth part BWP1 takes effect or first K2 slots after a second bandwidth part BWP1 takes effect. The BWP1 is a bandwidth part after a first bandwidth part BWP0 is switched. The BWP0 is a bandwidth part for transmitting the first signaling. K1 and K2 are positive integers.

In this embodiment of the present application, the first sending unit sends the aperiodic tracking reference signal on the slots for sending the reference signal, that is, the K1 slots before the second bandwidth part BWP1 takes effect or the first K2 slots after the second bandwidth part BWP1 takes effect.

In this embodiment of the present disclosure, the switch signaling carries one piece of the following information: switch time from the BWP0 to the BWP1, a starting position of a physical downlink shared channel of the BWP1, or time that the BWP1 takes effect.

In an embodiment, the slot, T=K+n, for sending the reference signal is a valid slot. The valid slot includes, but is not limited to, one of the following: a downlink slot, a slot including Nx downlink symbols, a slot in which each symbol for transmitting the reference signal is a downlink symbol, or a slot in which a symbol for transmitting the reference signal is not an uplink symbol, where Nx is greater than N0, Nx and N0 are both positive integers, K denotes a slot for transmitting the trigger signaling, n denotes a slot offset carried by offset signaling, and K and n are non-negative integers.

In this embodiment of the present application, if the determined slot, T=K+n, for sending the reference signal is not a valid slot, a valid slot T1 for sending the reference signal is determined in one of the manners described below.

T1 is the minimum valid slot greater than T; or T+T0 is determined as the valid slot for sending the reference signal, where T0 is a positive integer, and T+T0 denotes the minimum valid slot.

In this embodiment of the present application, the first sending unit sends the reference signal on the slot which is for sending the reference signal and determined as the valid slot.

Based on the same or similar concept as the preceding embodiments, an embodiment of the present application further provides another signal transmission apparatus configured on a first communication node. The signal transmission apparatus provided by the present application includes a second configuration unit and a second sending unit.

The second configuration unit is configured to configure second signaling.

The second sending unit is configured to send, according to the second signaling, a reference signal and/or a physical shared channel on an overlapping time domain resource.

The overlapping time domain resource is an overlapping portion of at least one time domain resource for sending the reference signal and at least one time domain resource for sending the physical shared channel.

The second signaling is high layer signaling. The second sending unit is configured to determine, according to the high layer signaling, to send the reference signal and/or the physical shared channel on the overlapping time domain resource.

The second signaling is physical layer signaling. The second sending unit is configured to determine, according to at least one of capability of a receiving end, a spatial parameter corresponding to the reference signal, or a spatial parameter corresponding to the physical shared channel, or according to a combination thereof, to send the reference signal and/or the physical shared channel on the overlapping time domain resource.

In this embodiment of the present application, the operation in which the reference signal and/or the physical shared channel is determined to be sent on the overlapping time domain resource includes one of the cases described below.

Only the reference signal is sent; only the physical shared reference channel is sent; or the reference signal and the physical shared reference channel are sent.

In this embodiment of the present application, a spatial parameter of the overlapping time domain resource is determined in at least one of the manners described below.

The spatial parameter of the overlapping time domain resource is determined through the second signaling; the spatial parameter of the overlapping time domain resource is determined in a manner of agreement; or the spatial parameter of the overlapping time domain resource is determined through the spatial parameter corresponding to the physical shared resource.

In this embodiment of the present application, the second signaling includes a parameter value V1 or a parameter value V2.

In the case where the parameter value of the second signaling is V1, it is indicated that the spatial parameter of the overlapping time domain resource is the spatial parameter corresponding to the physical shared resource.

Alternatively, in the case where the parameter value of the second signaling is V2, it is indicated that the spatial parameter of the overlapping time domain resource includes the spatial parameter corresponding to the physical shared resource, and the spatial parameter corresponding to the reference signal.

Alternatively, in the case where the parameter value of the second signaling is V1 or V2, the spatial parameter of the overlapping time domain resource is the spatial parameter corresponding to the physical shared resource.

Based on the same or similar concept as the preceding embodiments, an embodiment of the present application further provides a signal transmission apparatus configured on a second communication node. The signal transmission apparatus provided by the present application includes a first reception unit and a first slot determination unit.

The first reception unit is configured to receive first signaling.

The first slot determination unit is configured to determine a slot corresponding to a reference signal according to the received first signaling.

The first reception unit is further configured to receive the reference signal on the determined slot corresponding to the reference signal.

In this embodiment of the present application, the first signaling includes offset signaling.

The offset signaling includes joint information periodicityAndOffset about a periodicity and a slot offset.

In this embodiment of the present application, the first signaling includes trigger signaling and the offset signaling.

The operation in which the first slot determination unit determines the slot corresponding to the reference signal according to the received first signaling includes the operation described below.

It is determined, according to the trigger signaling and the offset signaling, that the slot corresponding to the reference signal is K+n, where K denotes a slot for transmitting the trigger signaling, n denotes a slot offset carried by the offset signaling, and K and n are integers greater than or equal to 0.

The operation in which the reference signal is received on the determined slot corresponding to the reference signal includes the operation described below.

The reference signal is received on the slot K+n.

In this embodiment of the present application, the first signaling includes cross-serving cell trigger signaling.

The operation in which the first slot determination unit determines the slot corresponding to the reference signal according to the received first signaling includes the operation described below.

First reference time Ki of N serving cells is determined according to the cross-serving cell trigger signaling, where Ki is an integer greater than or equal to 0, i=1, . . . , N, and N is an integer greater than 1.

In this embodiment of the present application, the first reference time Ki is the minimum slot not earlier than time T, or the first reference time Ki is not earlier than a slot where time T is located, or the first reference time Ki is the minimum symbol not earlier than time T. Time T denotes the last symbol of a time domain resource for transmitting the cross-serving cell triggering signaling.

In this embodiment of the present application, the first signaling further includes the offset signaling.

The operation in which the first slot determination unit determines the slot corresponding to the reference signal according to the received first signaling further includes the operation described below.

It is determined, according to the offset signaling and the first reference time Ki, that a slot corresponding to a reference signal of an i-th serving cell is Ki+n, where n denotes a slot offset value configured through the offset signaling. A slot offset value of the i-th serving cell is determined by a numerology of the i-th serving cell. Ki and n are non-negative integers, i=1, ..., N, and N is an integer greater than 1.

In this embodiment of the present application, the operation in which the first reception unit is configured to receive the reference signal on the determined slot corresponding to the reference signal includes the operation described below.

The reference signal is received on a respective slot corresponding to each serving cell, where the respective slot is for the reference signal.

In this embodiment of the present application, the N serving cells triggered by the cross-serving cell trigger signaling have the same carrier spacing or the same numerology, where N is an integer greater than 1.

In this embodiment of the present application, the first signaling includes the trigger signaling and the offset signaling.

The operation in which the first slot determination unit determines the slot corresponding to the reference signal according to the received first signaling includes the operation described below.

It is determined, according to the trigger signaling and the offset signaling, that the slot corresponding to the reference signal is K+n or K+n+1, where K denotes a slot for transmitting the trigger signaling, n denotes a slot offset carried by the offset signaling, and K and n are non-negative integers.

In this embodiment of the present application, the first reception unit is configured to receive a first part of an aperiodic tracking reference signal on the slot K+n corresponding to the reference signal, and receive a second part of the aperiodic tracking reference signal on the slot K+n+1 corresponding to the reference signal.

In this embodiment of the present application, the first signaling is switch signaling.

The operation in which the first slot determination unit determines the slot corresponding to the reference signal according to the received first signaling includes the operation described below.

The following slots are determined, according to the switch signaling, as slots corresponding to the reference signal: K1 slots before a second bandwidth part BWP1 takes effect, or first K2 slots after a second bandwidth part BWP1 takes effect. The BWP1 is a bandwidth part after a first bandwidth part BWP0 is switched. The BWP0 is a bandwidth part for transmitting the first signaling. K1 and K2 are positive integers.

The operation in which the first reception unit receives the reference signal on the determined slot corresponding to the reference signal includes the operation described below.

The aperiodic tracking reference signal is received on the slot for the reference signal.

In this embodiment of the present disclosure, the switch signaling carries one piece of the following information: switch time from the BWP0 to the BWP1, a starting position of a physical downlink shared channel of the BWP1, or time that the BWP1 takes effect.

In this embodiment of the present application, the operation in which the first slot determination unit determines the slot corresponding to the reference signal further includes the operation described below.

The determined slot, T=K+n, corresponding to the reference signal is a valid slot.

The valid slot includes one of the following: a downlink slot, a slot including Nx downlink symbols, a slot in which each symbol for transmitting the reference signal is a downlink symbol, or a slot in which a symbol for transmitting the reference signal is not an uplink symbol.

Nx is greater than N0, Nx and N0 are both positive integers, K denotes a slot for transmitting the trigger signaling, n denotes a slot offset carried by offset signaling, and K and n are non-negative integers.

In this embodiment of the present application, the operation in which the first slot determination unit determines the slot corresponding to the reference signal further includes the operation described below.

If the determined slot, T=K+n, corresponding to the reference signal is not the valid slot, a valid slot T1 corresponding to the reference signal is determined in one of the manners described below.

T1 is the minimum valid slot greater than T; or T+T0 is determined as the valid slot corresponding to the reference signal, where T0 is a positive integer, and T+T0 denotes the minimum valid slot.

In this embodiment of the present application, time intervals for channel state information processes corresponding to the reference signal are from K+T to N, where K denotes a slot for triggering the reference signal, or the slot for transmitting the trigger signaling, T denotes the maximum value among slot offsets of K1 reference signals, N denotes a slot for a channel state information reporting, K1 is a positive integer, K is a non-negative integer, and N>T+K.

In this embodiment of the present application, the slot offsets of the K1 reference signals at least include one of the following slot offsets: a slot offset n1 of a channel state information-reference signal resource for a channel measurement, a slot offset n2 of a channel state information-reference signal resource for an interference measurement, or a slot offset n3 of a channel state information-interference measurement resource.

Based on the same or similar concept as the preceding embodiments, an embodiment of the present application further provides a signal transmission apparatus configured on a second communication node. The signal transmission apparatus provided by the present application includes a second reception unit.

The second reception unit is configured to receive second signaling.

The second reception unit is further configured to receive, according to the received second signaling, a reference signal and a physical shared channel on an overlapping time domain resource. The overlapping time domain resource is an overlapping portion of at least one time domain resource for transmitting the reference signal and at least one time domain resource for transmitting the physical shared channel.

The second signaling is high layer signaling. The second reception unit is further configured to determine, according to the high layer signaling, to receive the reference signal and/or the physical shared channel on the overlapping time domain resource.

Alternatively, the second signaling is physical layer signaling. The second reception unit is further configured to determine, according to at least one of capability of a receiving end, a spatial parameter corresponding to the reference signal, or a spatial parameter corresponding to the physical shared channel, to receive the reference signal and/or the physical shared channel on the overlapping time domain resource.

In this embodiment of the present application, the second reception unit is further configured to determine the overlapping time domain resource.

In this embodiment of the present application, the operation in which the second reception unit determines to receive the reference signal and/or the physical shared channel on the overlapping time domain resource includes one of the cases described below.

Only the reference signal is received; only the physical shared channel is received; or the reference signal and the physical shared channel are received.

In this embodiment of the present application, a spatial parameter determination unit is configured to determine a spatial parameter of the overlapping time domain resource in at least one of the manners described below.

The spatial parameter of the overlapping time domain resource is determined through the second signaling; the spatial parameter of the overlapping time domain resource is determined in a manner of agreement; or the spatial parameter of the overlapping time domain resource is determined through the spatial parameter corresponding to the physical shared resource.

In this embodiment of the present disclosure, the second signaling includes at least one of a parameter value V1 or a parameter value V2.

In the case where the parameter value of the second signaling is V1, it is indicated that the spatial parameter of the overlapping time domain resource is the spatial parameter corresponding to the physical shared resource.

Alternatively, in the case where the parameter value of the second signaling is V2, it is indicated that the spatial parameter of the overlapping time domain resource includes the spatial parameter corresponding to the physical shared resource, and the spatial parameter corresponding to the reference signal.

Alternatively, in the case where the parameter value of the second signaling is V1 or V2, the spatial parameter of the overlapping time domain resource is the spatial parameter corresponding to the physical shared resource.

Based on the same or similar concept as the preceding embodiments, an embodiment of the present application further provides a device. The device includes a memory, a processor, and a computer program stored in the memory and executable on the processor. The processor, when executing the computer program, implements the processing of any signal transmission method according to the embodiments of the present application.

Based on the same or similar concept as the preceding embodiments, an embodiment of the present application further provides a computer-readable storage medium storing a computer program. The computer program, when executed by a processor, implements the processing of any signal transmission method according to the embodiments of the present application.

It is to be noted that the preceding embodiments are merely for ease of understanding by those skilled in the art, and are not intended to limit the scope of the present application. Any obvious substitutions, improvements and the like made by those skilled in the art to the present application are within the scope of the present application without departing from the concept of the present application.

What is claimed is:

1. A signal transmission method, performed by a first communication node, comprising:
configuring and sending a first signaling; and
determining, according to the first signaling, a slot for sending a reference signal, and sending the reference signal on the slot for sending the reference signal,
wherein the determined slot for sending the reference signal is a valid slot;
wherein a slot, $T=K+n$, for sending the reference signal is the valid slot, and the valid slot comprises one of the following: a downlink slot, a slot comprising Nx downlink symbols, a slot in which each symbol for transmitting the reference signal is a downlink symbol, or a slot in which a symbol for transmitting the reference signal is not an uplink symbol;
wherein Nx is greater than N0, Nx and N0 are both positive integers, N0 is a minimum number of symbols of a valid downlink slot, K denotes a slot for transmitting trigger signaling, n denotes a slot offset carried by offset signaling, and K and n are non-negative integers;
wherein in a case where the determined slot, $T=K+n$, for sending the reference signal is not the valid slot, a valid slot T1 for sending the reference signal is determined in one of following manners:
determining that the T1 is a minimum valid slot greater than the T; or
determining that $T+T0$ is the valid slot for sending the reference signal, wherein T0 is a positive integer and $T+T0$ is a minimum valid slot.

2. The method of claim 1, wherein the first signaling comprises trigger signaling and offset signaling, and determining, according to the first signaling, the slot for sending the reference signal comprises:
determining, according to the trigger signaling and the offset signaling, that the slot for the reference signal is $K+n$, wherein K denotes a slot for transmitting the trigger signaling, n denotes a slot offset determined according to the offset signaling, and K and n are integers greater than or equal to 0;
wherein the reference signal comprises at least one of the following:
an aperiodic channel state information-interference measurement resource;
an aperiodic channel state information-interference measurement resource set;
an aperiodic tracking reference signal resource; or
an aperiodic tracking reference signal resource set.

3. The method of claim 1, wherein the first signaling comprises cross-serving cell trigger signaling, and determining, according to the first signaling, the slot for sending the reference signal comprises:
determining first reference time Ki of N serving cells according to the cross-serving cell trigger signaling, wherein the Ki is an integer greater than or equal to 0, $i=1, \ldots, N$, and N is an integer greater than 1.

4. The method of claim 3, wherein the first reference time Ki satisfies one of following conditions:
the first reference time Ki is a minimum slot not earlier than time T;

the first reference time Ki is not earlier than a slot where time T is located; or the first reference time Ki is a minimum symbol not earlier than time T, wherein the time T is a last symbol of a time domain resource for transmitting the cross-serving cell trigger signaling.

5. The method of claim 3, wherein the first signaling further comprises offset signaling, and determining, according to the first signaling, the slot for sending the reference signal further comprises:

determining, according to the offset signaling and the first reference time Ki, that a slot where an i-th serving cell sends the reference signal is Ki+n, wherein n denotes a slot offset value configured through the offset signaling, a slot offset value of the i-th serving cell is determined by a numerology of the i-th serving cell, the Ki and n are non-negative integers, i=1, . . . , N, and N is an integer greater than 1;

wherein sending the reference signal on the slot for sending the reference signal comprises:

sending the reference signal respectively on slots for sending the reference signal, wherein each of serving cells corresponds to a respective slot of the slots;

wherein the reference signal comprises at least one of the following: an aperiodic channel state information-reference signal resource or an aperiodic channel state information-reference signal resource set; an aperiodic channel state information-interference measurement resource; or an aperiodic channel state information-interference measurement resource set.

6. The method of claim 1, wherein the first signaling comprises trigger signaling and offset signaling, and determining, according to the first signaling, the slot for sending the reference signal further comprises:

determining, according to the trigger signaling and the offset signaling, that slots for sending the reference signal are K+n and K+n+1, wherein K denotes a slot for transmitting the trigger signaling, n denotes a slot offset carried by the offset signaling, and K and n are non-negative integers;

wherein sending the reference signal on the slot for sending the reference signal comprises:

sending a first part of an aperiodic tracking reference signal on the slot K+n for sending the reference signal, and sending a second part of the aperiodic tracking reference signal on the slot K+n+1 for sending the reference signal.

7. The method of claim 1, wherein the first signaling is switch signaling, and determining, according to the first signaling, the slot for sending the reference signal comprises:

determining, according to the first signaling, following slots as slots for sending the reference signal: K1 slots before a second bandwidth part BWP1 takes effect or first K2 slots after a second bandwidth part BWP1 takes effect, wherein the BWP1 is a bandwidth part after a first bandwidth part BWP0 is switched, the BWP0 is a bandwidth part for transmitting the first signaling, and K1 and K2 are positive integers; and sending an aperiodic tracking reference signal on the slots for sending the reference signal;

wherein the switch signaling carries one of the following: switch time from the BWP0 to the BWP1, a starting position of a physical downlink shared channel of the BWP1, or time that the BWP1 takes effect.

8. The method of claim 1, wherein a time region for processing channel state information corresponding to the reference signal is from K+T to N, wherein K denotes a slot for triggering the reference signal or a slot for transmitting trigger signaling, T denotes a maximum value among slot offsets of K1 reference signals, N denotes a slot for a channel state information reporting, K1 is a positive integer, K is a non-negative integer, and N>T+K;

wherein the slot offsets of the K1 reference signals comprise at least one of the following: a slot offset n1 of a channel state information-reference signal resource for measuring a channel, a slot offset n2 of a channel state information-reference signal resource for measuring interference, or a slot offset n3 of a channel state information-interference measurement resource.

9. A signal transmission method, performed by a second communication node, comprising:

receiving a first signaling;

determining a slot corresponding to a reference signal according to the received first signaling; and receiving the reference signal on the determined slot corresponding to the reference signal, wherein the determined slot corresponding to the reference signal is a valid slot;

wherein the determining slot corresponding to the reference signal comprises:

determining that the slot corresponding to the reference signal is T=K+n which is the valid slot;

wherein the valid slot comprises one of the following: a downlink slot, or a slot comprising Nx downlink symbols, or a slot in which each symbol for transmitting the reference signal is a downlink symbol, or a slot in which a symbol for transmitting the reference signal is not an uplink symbol; and wherein Nx is greater than N0, Nx and N0 are both positive integers, N0 is a minimum number of symbols of a valid downlink slot, K denotes a slot for transmitting trigger signaling, n denotes a slot offset carried by offset signaling, and K and n are non-negative integers;

wherein determining the slot corresponding to the reference signal further comprises:

in a case where the determined slot, T=K+n, corresponding to the reference signal is not the valid slot, a valid slot T1 corresponding to the reference signal is determined in one of following manners:

determining that the T1 is a minimum valid slot greater than the T; or determining that T+T0 is the valid slot corresponding to the reference signal, wherein the T0 is a positive integer and T+T0 is a minimum valid slot.

10. The method of claim 9, wherein the first signaling comprises trigger signaling and offset signaling;

wherein determining the slot corresponding to the reference signal according to the received first signaling comprises:

determining, according to the trigger signaling and the offset signaling, that the slot corresponding to the reference signal is K+n, wherein K denotes a slot for transmitting the trigger signaling, n denotes a slot offset carried by the offset signaling, and K and n are integers greater than or equal to 0; and wherein receiving the reference signal on the determined slot corresponding to the reference signal comprises:

receiving the reference signal on the slot K+n;

wherein the reference signal comprises at least one of the following:

an aperiodic channel state information-interference measurement resource;
an aperiodic channel state information-interference measurement resource set;
an aperiodic tracking reference signal resource; or
an aperiodic tracking reference signal resource set.

11. The method of claim 9, wherein the first signaling comprises cross-serving cell trigger signaling; and
wherein determining the slot corresponding to the reference signal according to the received first signaling comprises:
determining first reference time Ki of N serving cells according to the cross-serving cell trigger signaling, wherein the Ki is an integer greater than or equal to 0, i=1, ..., N, and N is an integer greater than 1.

12. The signal transmission method of claim 11, wherein the first reference time Ki satisfies one of following conditions:
the first reference time Ki is a minimum slot not earlier than time T;
the first reference time Ki is not earlier than a slot where time T is located; or
the first reference time Ki is a minimum symbol not earlier than time T,
wherein the time T is a last symbol of a time domain resource for transmitting the cross-serving cell trigger signaling.

13. The method of claim 11, wherein the first signaling further comprises offset signaling; and determining the slot corresponding to the reference signal according to the received first signaling further comprises:
determining, according to the offset signaling and the first reference time Ki, that a slot corresponding to the reference signal of an i-th serving cell is Ki+n, wherein n denotes a slot offset value configured through the offset signaling, a slot offset value of the i-th serving cell is determined by a numerology of the i-th serving cell, the Ki and n are non-negative integers, i=1, ..., N, and N is an integer greater than 1;
wherein receiving the reference signal on the determined slot corresponding to the reference signal comprises:
receiving the reference signal respectively on slots for the reference signal, wherein each of serving cells corresponds to a respective slot of the slots; and
wherein the reference signal comprises at least one of the following: an aperiodic channel state information-reference signal resource or an aperiodic channel state information-reference signal resource set; an aperiodic channel state information-interference measurement resource; or an aperiodic channel state information-interference measurement resource set.

14. The method of claim 9, wherein the first signaling comprises trigger signaling and offset signaling; and
wherein determining the slot corresponding to the reference signal according to the received first signaling comprises:
determining, according to the trigger signaling and the offset signaling, that the slot corresponding to the reference signal is K+n and K+n+1, wherein K denotes a slot for transmitting the trigger signaling, n denotes a slot offset carried by the offset signaling, and K and n are non-negative integers;
wherein receiving the reference signal on the determined slot corresponding to the reference signal comprises:
receiving a first part of an aperiodic tracking reference signal on the slot K+n corresponding to the reference signal, and receiving a second part of the aperiodic tracking reference signal on the slot K+n+1 corresponding to the reference signal.

15. The method of claim 9, wherein the first signaling is switch signaling; and
wherein determining the slot corresponding to the reference signal according to the received first signaling comprises:
determining, according to the switch signaling, following slots as slots corresponding to the reference signal: K1 slots before a second bandwidth part BWP1 takes effect or first K2 slots after a second bandwidth part BWP1 takes effect, wherein the BWP1 is a bandwidth part after a first bandwidth part BWP0 is switched, the BWP0 is a bandwidth part for transmitting the first signaling, and K1 and K2 are positive integers; and
wherein receiving the reference signal on the determined slot corresponding to the reference signal comprises:
receiving an aperiodic tracking reference signal on the slots for the reference signal;
wherein the switch signaling carries one of the following: switch time from the BWP0 to the BWP1, a starting position of a physical downlink shared channel of the BWP1, or time that the BWP1 takes effect.

16. The method of claim 9, wherein a time region for processing channel state information corresponding to the reference signal is from K+T to N, wherein K denotes a slot for triggering the reference signal, or a slot for transmitting trigger signaling, T denotes a maximum value among slot offsets of K1 reference signals, N denotes a slot for a channel state information reporting, K1 is a positive integer, K is a non-negative integer, and N>T+K;
wherein the slot offsets of the K1 reference signals comprise one of the following: a slot offset n1 of a channel state information-reference signal resource for measuring a channel, a slot offset n2 of a channel state information-reference signal resource for measuring interference, or a slot offset n3 of a channel state information-interference measurement resource.

17. A first communication node, comprising a memory, a processor, and a computer program stored in the memory and executable on the processor, wherein the processor, when executing the computer program, implements:
configuring and sending a first signaling; and
determining, according to the first signaling, a slot for sending a reference signal, and
sending the reference signal on the slot for sending the reference signal,
wherein the determined slot for sending the reference signal is a valid slot;
wherein a slot, T=K+n, for sending the reference signal is a valid slot, and the valid slot comprises one of the following: a downlink slot, a slot comprising Nx downlink symbols, a slot in which each symbol for transmitting the reference signal is a downlink symbol, or a slot in which a symbol for transmitting the reference signal is not an uplink symbol;
wherein Nx is greater than N0, Nx and N0 are both positive integers, N0 is a minimum number of symbols of a valid downlink slot, K denotes a slot for transmitting trigger signaling, n denotes a slot offset carried by offset signaling, and K and n are non-negative integers;
wherein in a case where the determined slot, T=K+n, for sending the reference signal is not the valid slot, a valid slot T1 for sending the reference signal is determined in one of following manners:
determining that the T1 is a minimum valid slot greater than the T; or determining that T+T0 is the valid slot for sending the reference signal, wherein T0 is a positive integer and T+T0 is a minimum valid slot.

18. A second communication node, comprising a memory, a processor, and a computer program stored in the memory and executable on the processor, wherein the processor, when executing the computer program, implements:
receiving a first signaling;
determining a slot corresponding to a reference signal according to the received first signaling; and
receiving the reference signal on the determined slot corresponding to the reference signal,
wherein the determined slot corresponding to the reference signal is a valid slot;
wherein the determining slot corresponding to the reference signal comprises:
determining that the slot corresponding to the reference signal is T=K+n which is the valid slot;
wherein the valid slot comprises one of the following: a downlink slot, or a slot comprising Nx downlink symbols, or a slot in which each symbol for transmitting the reference signal is a downlink symbol, or a slot in which a symbol for transmitting the reference signal is not an uplink symbol; and
wherein Nx is greater than N0, Nx and N0 are both positive integers, N0 is a minimum number of symbols of a valid downlink slot, K denotes a slot for transmitting trigger signaling, n denotes a slot offset carried by offset signaling, and K and n are non-negative integers;
wherein determining the slot corresponding to the reference signal further comprises:
in a case where the determined slot, T=K+n, corresponding to the reference signal is not the valid slot, a valid slot T1 corresponding to the reference signal is determined in one of following manners:
determining that the T1 is a minimum valid slot greater than the T; or
determining that T+T0 is the valid slot corresponding to the reference signal, wherein the T0 is a positive integer and T+T0 is a minimum valid slot.

* * * * *